(12) United States Patent
Evers

(10) Patent No.: US 7,950,622 B2
(45) Date of Patent: May 31, 2011

(54) SYSTEM, APPARATUS AND METHOD FOR CONTROLLING VALVES

(75) Inventor: John N. Evers, Albany, MN (US)

(73) Assignee: Honeywell International, Inc., Morristown, NJ (US)

( * ) Notice: Subject to any disclaimer, the term of this patent is extended or adjusted under 35 U.S.C. 154(b) by 875 days.

(21) Appl. No.: 11/880,930

(22) Filed: Jul. 25, 2007

(65) Prior Publication Data
US 2009/0026397 A1 Jan. 29, 2009

(51) Int. Cl.
*F16K 31/02* (2006.01)
(52) U.S. Cl. .............. 251/129.04; 251/129.01
(58) Field of Classification Search .......... 251/129.01, 251/129.02, 129.04; 361/152–154
See application file for complete search history.

(56) References Cited

U.S. PATENT DOCUMENTS

| | | | |
|---|---|---|---|
| 3,416,052 A * | 12/1968 | Russell et al. | 318/599 |
| 3,741,710 A | 6/1973 | Nelson | |
| 4,386,553 A | 6/1983 | Thoman et al. | |
| 6,560,088 B1 * | 5/2003 | Beck et al. | 361/154 |
| 6,918,571 B1 * | 7/2005 | Rose | 251/129.18 |
| 6,945,507 B2 | 9/2005 | Baarda | |
| 6,978,798 B2 | 12/2005 | Baarda | |
| 7,066,203 B2 | 6/2006 | Baarda | |
| 7,073,524 B2 * | 7/2006 | Chian | 137/1 |
| 7,128,093 B2 * | 10/2006 | Silverbrook | 137/553 |
| 2006/0290331 A1 * | 12/2006 | Harris et al. | 323/247 |
| 2010/0031681 A1 * | 2/2010 | Dolin | 62/225 |

FOREIGN PATENT DOCUMENTS

| | | |
|---|---|---|
| DE | 2111343 | 4/1972 |
| DE | 19821853 | 7/1999 |
| DE | 10026035 | 6/2001 |
| DE | 10018757 | 10/2001 |
| EP | 0379759 | 4/1995 |
| EP | 1058060 | 12/2000 |
| JP | 07166583 | 6/1995 |
| JP | 08177580 | 7/1996 |

OTHER PUBLICATIONS

U.S. Appl. No. 11/880,909, filed Jul. 25, 2007, Moenkhaus et al.

* cited by examiner

*Primary Examiner* — John K Fristoe, Jr.
*Assistant Examiner* — Marina Tiet Jen
(74) *Attorney, Agent, or Firm* — Hollingsworth & Funk, LLC

(57) ABSTRACT

Systems, apparatuses and methods for controlling valves through controlled power escalation towards the actuation threshold of the valve. A power signal is applied to a control input of a valve at a level less than a valve switch threshold at which the valve will be actuated. The power to the control input is then progressively increased. The valve is actuated when the power signal eventually reaches the valve switch threshold, thereby actuating the valve using a power signal commensurate with the actual valve switch threshold of the particular valve and its current operating conditions.

20 Claims, 4 Drawing Sheets

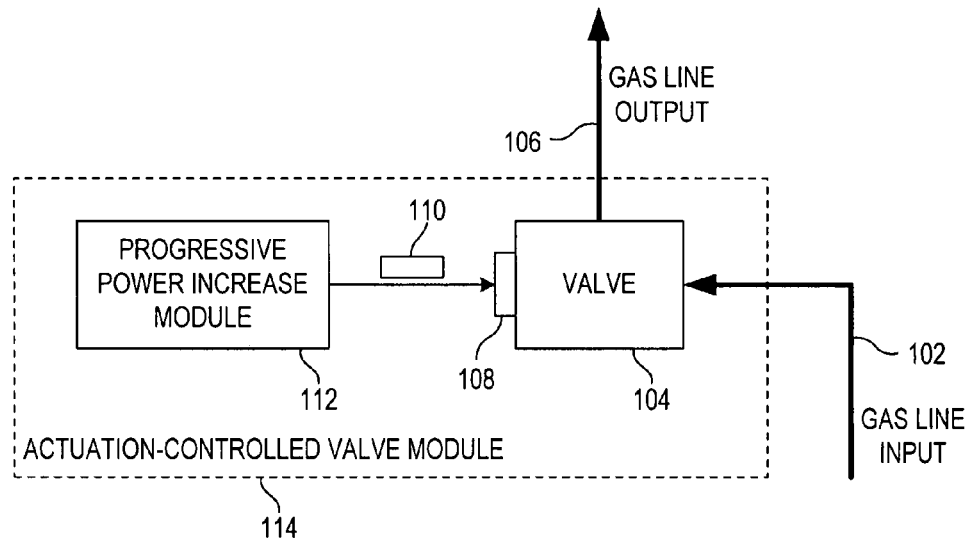
FIG. 1
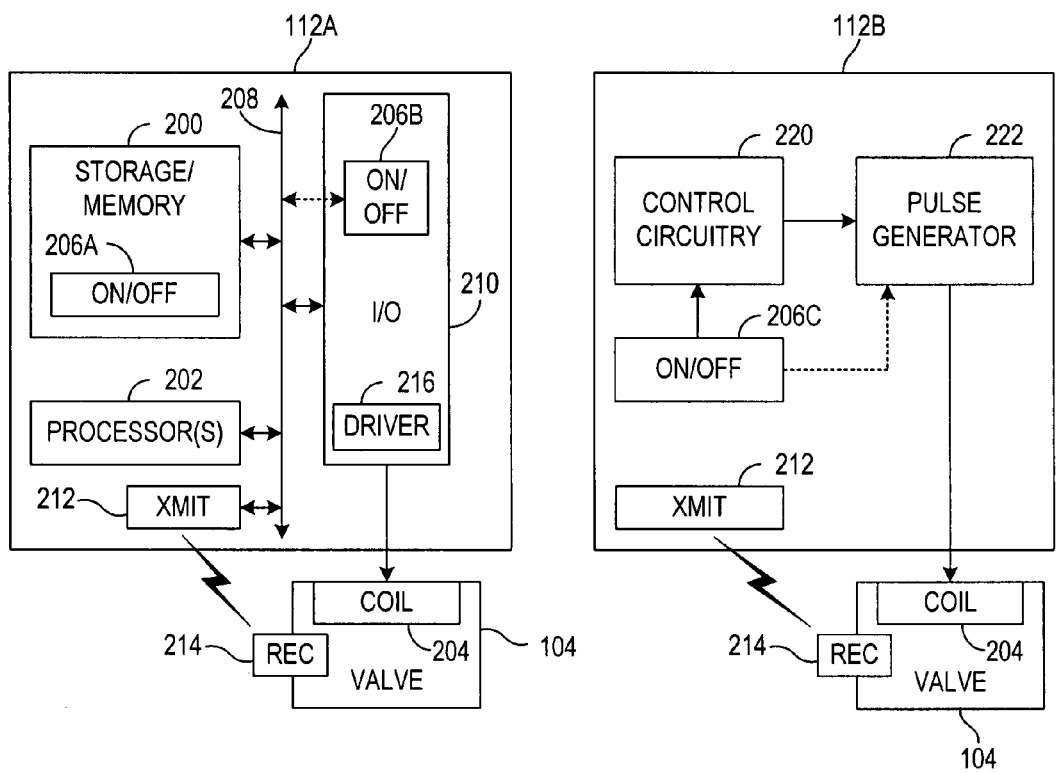
FIG. 2A  FIG. 2B

SYSTEM, APPARATUS AND METHOD FOR CONTROLLING VALVES

FIELD OF THE INVENTION

This invention relates in general to valve operation, and more particularly to a system, apparatus and method for reducing valve deterioration and prolonging valve life through controlled power escalation towards the actuation threshold of the valve.

BACKGROUND OF THE INVENTION

Solenoid valves are often used to automatically control the flow of gas or liquid in a wide variety of applications and environments. A solenoid is generally an electromechanical device that is controlled using electricity by enabling the flow of current through a coil, which ultimately actuates a valve such as a pneumatic or hydraulic valve, or a solenoid switch. For example, an electromechanical solenoid includes an inductive coil that is wound around a movable armature. The coil is typically shaped such that the armature can be moved in and out, thereby changing the inductance of the coil as an electromagnet. The controllable motion of the armature can be used to provide a mechanical force to control, for example, gas flow through a valve. In this manner, moving the actuator through the core of a solenoid valve enables the channeling of gas or liquid to an appropriate port. Thus the valve changes state when the actuator is moved inside the core, either opening or closing a port(s) to allow a gas or liquid to flow when the actuator is in an active state. A spring or other mechanism may be used to return the actuator to a resting state upon removal of the current flow, thereby closing the port for gas or liquid flow.

Solenoid valves therefore include moveable mechanical parts that are controlled by providing the appropriate current to the valve. The current can be applied by providing a signal(s) to initiate the flow of current, which in turn enables control of the solenoid valve. However, due to the moving mechanical parts, these solenoid valves can degrade and will eventually wear out. Extending the life of such valves beneficially impacts system cost and reduces system down time.

Accordingly, there is a need for an apparatus and method for extending the mean time to failure (MTTF) for solenoid valves. The present invention fulfills these and other needs, and offers other advantages over prior art approaches.

SUMMARY OF THE INVENTION

To overcome limitations in the prior art described above, and to overcome other limitations that will become apparent upon reading and understanding the present specification, the present invention discloses a system, apparatus and method for controlling valves.

In accordance with one embodiment of the invention, a method is provided that involves applying a power signal to the control input of a valve at a level less than the valve switch threshold at which the valve will be actuated. The power to the control input is then progressively increased, and the valve is actuated when the power signal reaches the valve switch threshold.

According to more particular embodiments of such a method, progressively increasing the power to the control input may involve increasing a duty cycle of the power signal over time. In another embodiment, progressively increasing the power to the control input may involve increasing an amplitude of the power signal over time.

Another embodiment of such a method further involves monitoring whether the valve is actuated, and increasing the power to the control input in response to feedback indicating that the valve has not yet been actuated. In another embodiment, progressively increasing the power to the control input involves progressively increasing the power without regard to when the valve is actuated. Still another embodiment of such a method further involves receiving a signal requesting gas flow, and applying the power signal to the control input of a solenoid gas valve in response to receiving the signal requesting gas flow.

In one embodiment the valve is represented by a normally-closed solenoid gas valve, and opening the normally-closed solenoid gas valve when the power signal reaches the valve switch threshold. In an alternative embodiment, the valve is represented by a normally-open solenoid gas valve, and opening the normally-open solenoid gas valve when the power signal reaches the valve switch threshold.

In accordance with another embodiment of the invention, an apparatus is provided that includes at least input and output modules, and a processing module. The input module is configured to receive a valve state change signal. The processing module is coupled to the input module to receive notification of the valve state change signal, and in response to generate a valve control signal having an increasing duty cycle over time. The output module is configured to output the valve control signal. Such an output signal can be utilized by a recipient valve to control the actuation of the valve.

According to more particular embodiments of such an apparatus, the processing module may be configured to increase the duty cycle of the valve control signal until the duty cycle reaches a duty cycle limit. In another embodiment, the input module is configured to receive a valve state signal indicative of an open or closed state of a normally-closed valve, where the processing module is configured to increase the duty cycle of the valve control signal in response to each valve state signal indicating a closed state of the normally-closed valve. In an alternative embodiment involving receipt of the valve state signal, the processing module is configured to increase the duty cycle of the valve control signal in response to each valve state signal indicating an open state of the normally-open valve.

Still other embodiments of such an apparatus include a storage module configured to store at least instructions, where the processing module is coupled to the storage module to receive and execute the instructions to responsively generate the valve control signal having an increasing duty cycle over time. In yet another embodiment, a wireless transmission module is coupled to receive the valve control signal generated by the processing module, and is configured to wirelessly transmit the valve control signal over the air for use by a valve associated with the valve state change signal.

In accordance with another embodiment of the invention, a system is provided that includes at least a progressive power increase module and a solenoid valve. In one embodiment, the progressive power increase module is configured to initially generate a valve control signal having a duty cycle providing a power less than a valve switch threshold at which the solenoid valve will be actuated, and further to progressively increase the duty cycle of the valve control signal. The solenoid valve includes an input coupled to the progressive power increase module. The solenoid valve includes a coil to receive the valve control signal and change the state of the solenoid valve when the duty cycle of the valve control signal reaches the valve switch threshold.

In one particular embodiment of such a system, the progressive power increase module is implemented using at least a control circuit and a pulse width modulator. The control circuit is configured to provide a pulse width indicator signal designating increasing pulse widths over time. The pulse width modulator is coupled to the control circuit to receive the pulse width indicator, and responsively generates the valve control signal having the progressively increased duty cycle.

In another particular embodiment of such a system, the progressive power increase module is implemented using a processing module configured to generate the valve control signal having the progressively increased duty cycle, and an output module configured to output the valve control signal.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of systems, apparatuses, and methods in accordance with the invention.

BRIEF DESCRIPTION OF THE DRAWINGS

The invention is described in connection with the embodiments illustrated in the following diagrams.

FIG. 1 is a block diagram generally illustrating a representative embodiment of a system for controlling gas flow in accordance with the invention;

FIGS. 2A and 2B illustrate representative embodiments of progressive power increase modules in accordance with the present invention;

DETAILED DESCRIPTION OF EMBODIMENTS OF THE INVENTION

Figure 3A:
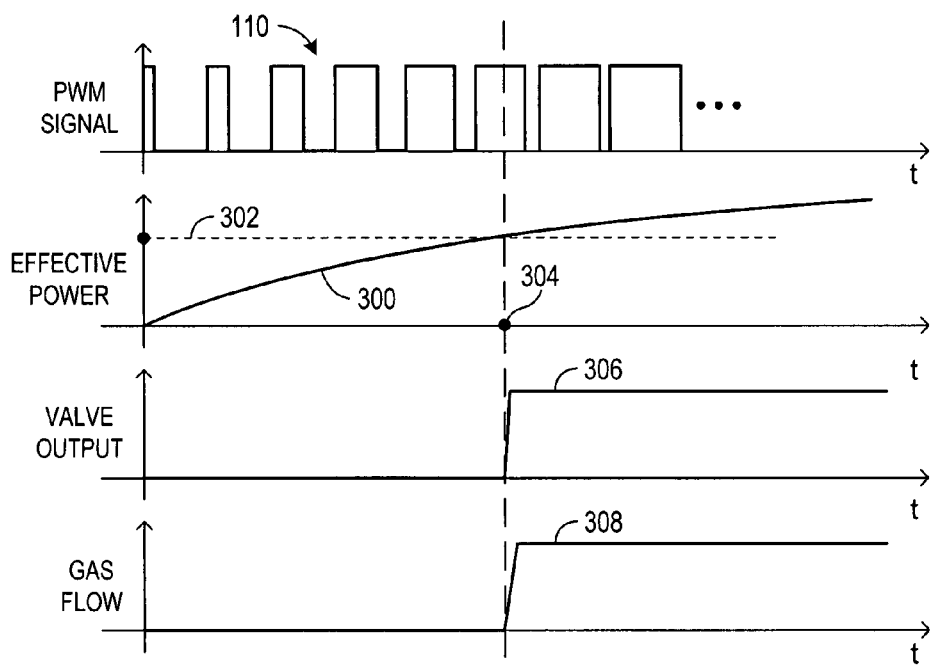
FIGS. 3A and 3B are representative timing diagrams generally illustrating relative operations in controlling a valve(s) in accordance with the present invention.

In the following description of various exemplary embodiments, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

As previously indicated, solenoid valves include moveable mechanical parts that are controlled by providing the appropriate current to the valve. The current can be applied by providing one or more signal to initiate current flow, thereby enabling control of the solenoid valve. However, such moving mechanical parts degrade with use, and will eventually wear out. This degradation is aggravated as a result of the high impact that can occur when driving the valve coil with normal on/off control voltages. For example, applying a standard control voltage to drive a solenoid valve coil closed causes a high impact on the actuator and core. This results in significant strain on the mechanical components, which is exacerbated with solenoid valves that are repeatedly opened and closed.

Generally, the present invention provides a system, apparatus and method for reducing the force required to actuate a valve, such as a solenoid valve. The invention uses controlled incrementation of drive power to the valve, to essentially ease the drive power to a point where the force applied to the drive the coil will ultimately open or close the valve (e.g., depending on whether the valve is a normally-open or normally-closed valve). This significantly reduces strain, wear and consequent failure of the valve.

In one embodiment, a solenoid valve is driven by a pulse width modulated (PWM) signal where the duty cycle, and thus the power applied to the valve, begins at a first lower value and is then increased until the required drive power is reached. At some point during the sequence the force applied by the driven coil will overcome the friction and an opposing spring force, and the valve will change state (e.g., the valve will be opened in a normally-closed valve, or closed in a normally-open valve). This point will vary with factors such as temperature, gas pressure, valve age, variations in valve construction, etc. The invention allows the valve to be actuated with an amount of force more closely commensurate with the actual force required to actuate the valve, rather than applying a force that is greater than what is required to actuate the valve which can significantly accelerate valve deterioration.

FIG. 1 is a block diagram generally illustrating a representative embodiment of a system 100 for controlling gas flow in accordance with the invention. While the embodiment of FIG. 1 is illustrated and described in terms of gas flow control, the invention is equally applicable to controlling solenoid actuation for liquid, air, gas, etc. In the illustrated embodiment, a gas line input 102 supplies gas to controllable valve 104. The valve 104 represents a solenoid valve or other analogous valve using electromagnetics to control the state of the valve. The valve 104 controls the flow of gas from the gas line input 102 to the gas line output 106. Whether the valve 104 allows the gas to traverse the valve depends on the state of the solenoid actuator (not shown) as controlled at its input 108 by an input signal 110. In accordance with the illustrated embodiment, the progressive power increase module 112 provides the input signal 110 to the valve input 108 of the valve 104. The progressive power increase module 112 may be separate from the valve 104, or alternatively may be collectively provided with the valve 104 as depicted by the actuation controlled valve module 114.

In accordance with embodiments of the invention, the progressive power increase module 112 of FIG. 1 provides a progressive or otherwise gradual increase in the power applied to the valve 104 input 108. Prior art control systems apply a single relatively large power signal that will ensure actuation of any valve, regardless of the ambient or operational temperature, the age and/or type of valve, gas pressure, variations in valve construction, etc. Thus, in most prior art valve actuation situations, an actuation signal is applied that is much larger than is needed for the particular valve, resulting in additional strain and accelerated deterioration of the valve. By increasingly incrementing the control signal 110 to the valve 104 as is facilitated by the present invention, the valve will be actuated at a level more commensurate with that particular valve's actual triggering point in that environment. Thus, the overall strength of the control signal 110 that is provided to the valve 104 in any given system 100 may differ from valve to valve, system to system, surrounding environment to surrounding environment, etc.

FIG. 2A illustrates a representative embodiment of a progressive power increase module 112A in accordance with the present invention. The embodiment of FIG. 2A is a processor-based embodiment involving a processing system of one or more processors that are capable of executing instructions to perform the desired functions. The storage/memory 200 can store instructions executable by the processor(s) 202. The storage/memory 200 represents any type of media that can store instructions and optionally data, such as read-only memory (ROM), flash ROM, programmable and/or erasable ROM, random access memory (RAM), cache memory, smart card, CD-ROM or other optical disk, magnetic disks, tape, etc. Similarly, the processing/control unit 202 may include any one or more of a microprocessor, reduced instruction set computer (RISC), or other central processing module. The processing unit 202 need not be a single device, and may include one or more processors. For example, the processing unit may include a master processor and associated slave processors coupled to communicate with the master processor.

In one embodiment, the valve 104 is driven by a pulse width modulator (PWM) where the duty cycle begins at a first value and is periodically or otherwise gradually increased until the final required drive power is reached. In the embodiment of FIG. 2A, the processor executes instructions stored at the storage/memory 200 to identify the need to change the state of the valve 104, and produce the desired progressive pulse width modulated output to drive the coil 204 of the valve 104. More particularly, an on/off signal is recognized by the processing unit 202 to initiate the process. In one embodiment, the on/off signal is internally recognized by the processing unit 202. For example, the instructions stored in the storage/memory 200 may have instructions to identify an on/off 206A feature, such as where sensor or other input data is recognized as a condition to open the valve 104. In such case, the processing unit 202 executes on/off 206A instructions to initiate the valve opening process (or valve closing process if the case may be). The processing unit 202 can communicate with the storage/memory 200 via a bus 208 or other known manner.

In an alternative embodiment, the on/off signal(s) to initiate the process can be obtained directly through input/output (I/O) circuitry 210, as depicted by the on/off 206B portion of the I/O 210. For example, a user may manually provide input to turn on the valve 104, where this input is provided to the processing unit 202 via the on/off 206B portion of the I/O 210. External sensors or other external circuitry (not shown) may also be coupled to the I/O 210 to provide the on/off 206B signal to the processing unit 202. The I/O 210 may also be coupled to the processing unit 202 via the bus 208 or otherwise.

In operation, the processing unit 202 receives the on/off signal, which invokes a program, routine, or other set of instructions stored at the storage/memory 200 to generate a PWM signal. As will be described in greater detail below, this PWM signal initially has a first duty cycle, and the processor as directed by the instructions progressively increases the duty cycle of the signal. The generated PWM signal is provided to the coil 204 of the valve 104 via the I/O 210, or via direct connection, or otherwise. The system may even include wireless transmission and wireless receiving circuitry such that the processor 202 notifies a wireless transmitter 212 to send the PWM signal over-the-air (OTA) to a wireless receiver 214 integral with or otherwise associated with the valve 104. In such an embodiment, the valve 104 may have a driver associated therewith to receive the wireless control signal and generate a coil drive signal corresponding to the received wireless control signal. The PWM signal may be provided to the valve coil 204 in any known manner.

As the PWM signal generated by the processing unit 202 progressively increases in duty cycle, the resulting power of the signal also increases. It should be noted that the processor may provide its PWM signal to a driver 216 that is configured to provide the requisite power to appropriately drive the coil 204. At some point during this increase of signal duty cycle (and consequently power), the force applied to the coil 204 will overcome opposing forces such as friction and/or opposing spring forces, and the valve 104 will change state (e.g., open). By gradually increasing the power to the valve 104 in this manner, the valve can be opened (or closed in a normally-open configuration) with an approximately minimum power level required to open the valve 104. Thus, the power used to open the valve 104 is more commensurate with the valve opening/closing threshold for that particular valve under the particular conditions in which it is operating. This results in reduced strain on the operating components of the valve 104.

FIG. 2B illustrates another representative embodiment of a progressive power increase module 112B in accordance with the present invention. The embodiment of FIG. 2B implements discrete circuitry to generate the PWM signal to the coil 204. For example, on/off sensors or other input 206C may provide a triggering signal to the control circuitry 220 that senses the triggering signal and provides instructive signals to the pulse generator 222 that produces the PWM signal having a progressively increasing duty cycle. Alternatively, the on/off 206C may be directly coupled to the pulse generator 222 to initiate the PWM signal. In one embodiment, the control circuit 220 is configured to provide a pulse width indicator signal that designates increasing pulse widths over time. The pulse generator 222, or pulse width modulator, is coupled to the control circuit 220 to receive the pulse width indicator and in response to generate a valve control signal having the progressively increased duty cycle. Operation of the circuit 112B is otherwise analogous to that described in connection with the progressive power increase module 112A as described in connection with FIG. 2A.

The embodiments of FIGS. 2A and 2B are representative, exemplary embodiments of progressive power increase modules in accordance with the invention. These representative embodiments are illustrated to facilitate an understanding of the invention, and the invention is not limited to the particular embodiments shown.

FIG. 3A is a representative timing diagram generally illustrating relative operations in controlling a valve(s) in accordance with the present invention. An embodiment of the control signal 110 described in connection with FIG. 1 is depicted as a PWM signal in FIG. 3A. Thus, in the embodiment of FIG. 3A the control signal 110 is represented by a pulse width modulated signal having an increasing duty cycle over time (t). As the duty cycle of the signal 110 increases over time (t), the effective power 300 also increases. When the effective power 300 reaches a threshold 302 as shown at time 304, the opposing forces are overcome, and the valve output 306 is changed. Thus, where the valve operates as a normally-closed gas valve, gas flow 308 is enabled.

Alternative or additional manners of gradually increasing the effective power may also be used, such as, for example, progressively increasing an amplitude of a signal capable of being presented to the solenoid valve coil, increasing the average current presented to the coil using an increasing current source, etc. Another embodiment can utilize a multiple-tap coil or otherwise implement multiple coils, where a first coil is energized to provide the initial signal, and additional coils are thereafter sequentially energized. As the amount of force the coil can produce is the number of turns times the current, the coil force available to actuate the valve increases as additional coils are energized.

Figure 3B:
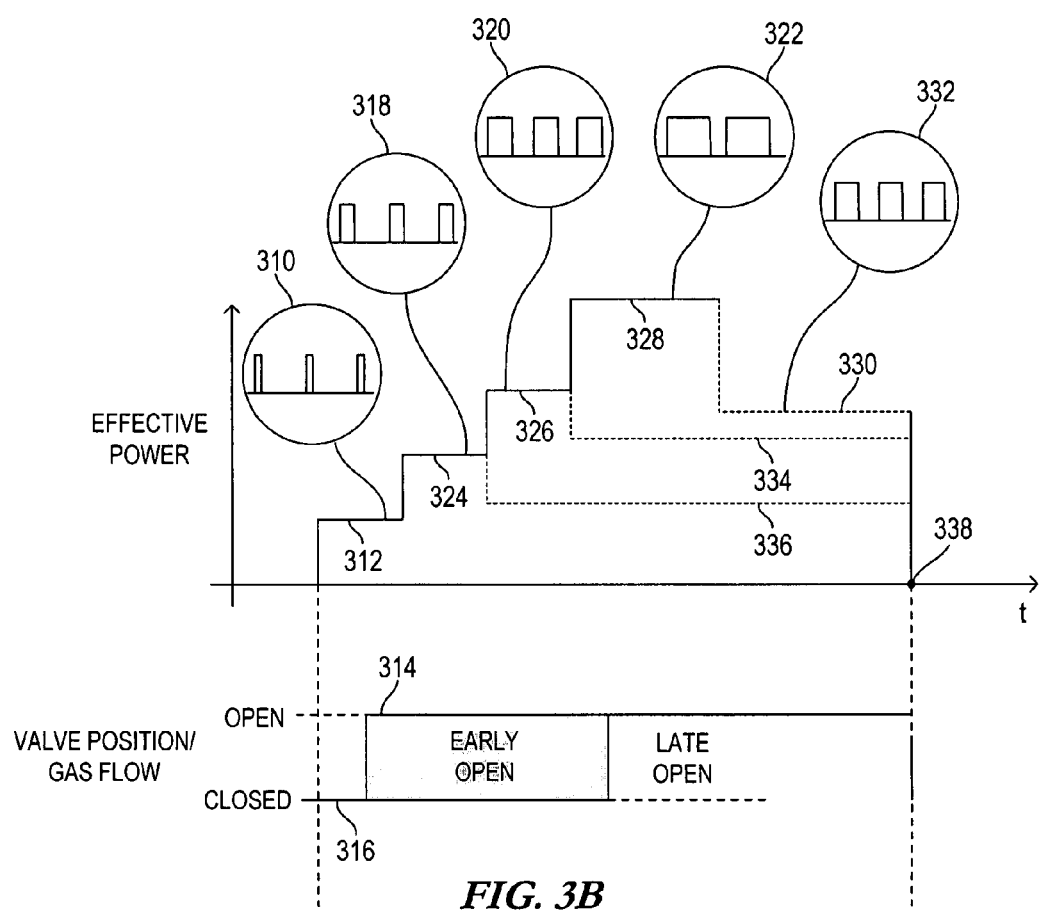

FIG. 3B is another representative timing diagram generally illustrating relative operations in controlling a valve(s) in accordance with the present invention. The embodiment of FIG. 3B involves providing increasing duty cycles in stages. For example, a first duty cycle 310 is applied, resulting in a first effective power 312. The resulting valve position, and consequently gas flow, may be opened 314 or remain closed 316 in view of providing this first effective power 312. In the illustrated embodiment, this is identified as an "early" opening of the valve in that it occurs prior to providing an established maximum duty cycle (and consequently a maximum average instantaneous current).

In one embodiment feedback may be provided that indicates whether the valve is open 314 or closed 316, and if the valve has opened 314, the duty cycle (and consequently the current) need not be further increased. If the feedback indicates that the valve is still closed 316, the duty cycle may be further increased 318, 320, etc., until the valve opens 314 at some point or a final established duty cycle 322 is reached. Each of these duty cycle stages 310, 318, 320, 322 is associated with a respective effective power level 312, 324, 326, 328. In another embodiment, the duty cycle continues to increase regardless of whether the valve is opened. For example, where no feedback is provided the duty cycle may be repeatedly increased 318, 320, etc., until the final established duty cycle 322 is reached. It should be noted that while four "stages" of duty cycle increments are shown here, any desired number of levels may be implemented in accordance with the invention, and the illustrated levels in FIG. 3B are provided for purposes of facilitating an understanding of this embodiment of the invention.

The duty cycle that is to be applied at any stage may be determined in various manners, such as increasing the duty cycle by a predetermined amount at particular time intervals, increasing the duty cycle by a predetermined amount in response to feedback, increasing the duty cycle according to stored duty cycle information, etc. In one embodiment, values corresponding to different duty cycles are stored, such as in a table. A processor-based embodiment can then read a first value corresponding to a first duty cycle, and generate the resulting signal 310 and corresponding effective power level 312. Depending on the conditions for increasing the duty cycle, the next value in the table can then be read to generate the second signal 318 and corresponding effective power level 324. This can continue until the valve is opened or until a signal 322 at the final established duty cycle is created.

In one embodiment, such as where no feedback as to the state of the valve is provided, a final duty cycle and corresponding effective power level may be reached. As previously indicated, different valve manufacturers, models, designs and other valve characteristics, in addition to temperature and other environmental conditions, may result in valves being actuated at different times as the effective power level is increased. In one embodiment, a final duty cycle 322 and associated effective power level 328 is generated such that it essentially guarantees (barring defective valve components, for example) actuation of the valve at that level. Such an embodiment would obviate the need for feedback, at least to ensure that the valve is eventually actuated. In the embodiment of FIG. 3B, this is depicted as a "late open" (or "late actuation") condition where the final signal 322 generates an effective power level 328 to guarantee the valve's actuation under normal operating conditions and assuming that components and/or circuitry are not defective.

The effective power or current applied to actuate (e.g., open) a valve typically needs to be at a level higher than what is required to maintain valve actuation. Therefore, in accordance with one embodiment of the invention, the duty cycle and corresponding effective power level may be decreased after the valve has been actuated. For example, assuming that a late open condition occurred by applying the effective power 328, the effective power may thereafter be reduced to the effective power level 330 by reducing the duty cycle of the signal 332. This can be implemented at any level following valve actuation, as depicted by the post-actuation effective power levels 334, 336, etc. Regardless of whether or not such post-actuation power reduction techniques are used, the effective power applied is withdrawn when the valve has been ordered to turn off, as depicted by the drop in effective power at time 338.

Figure 4A:
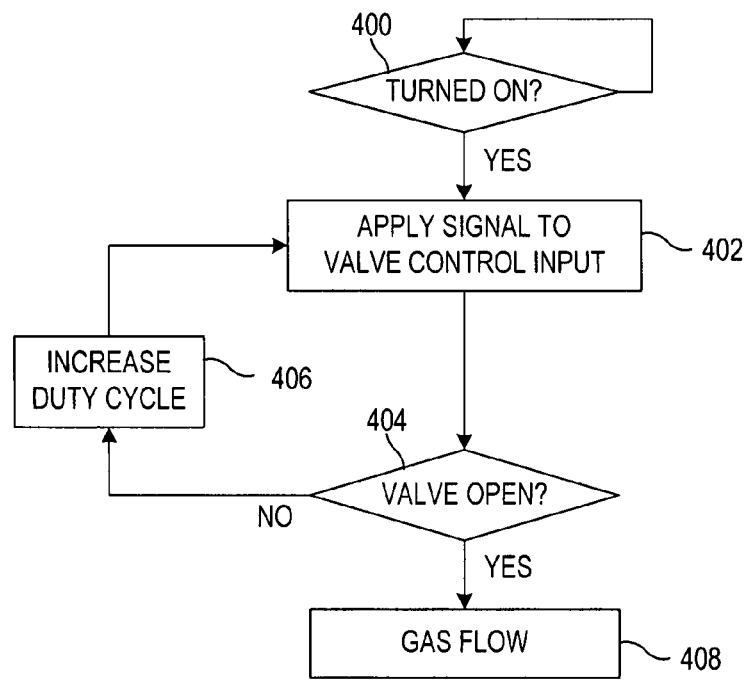
FIGS. 4A, 4B and 4C are flow diagrams generally illustrating exemplary embodiments of methods for controlling a solenoid gas valve or other valve in accordance with the present invention.

FIG. 4A is a flow diagram generally illustrating an exemplary embodiment of a method for controlling a solenoid gas valve or other valve in accordance with the present invention. When a sensor, user input, date, time, condition and/or other input criteria indicates that the valve is to be turned on as determined at block 400, a signal is applied 402 to the valve control input. If the valve does not open as depicted at block 404, the duty cycle of the signal is increased 406, and the resulting increased duty cycle signal is applied 402 to the valve control input. This continues until the valve opens, resulting in gas flow 408 through the valve. In this embodiment, therefore, the duty cycle is increased in response to feedback from the valve indicating whether or not the valve has opened. Such feedback may be provided by, for example, a sensor associated with the valve itself, a gas flow sensor, etc.

Figure 4B:
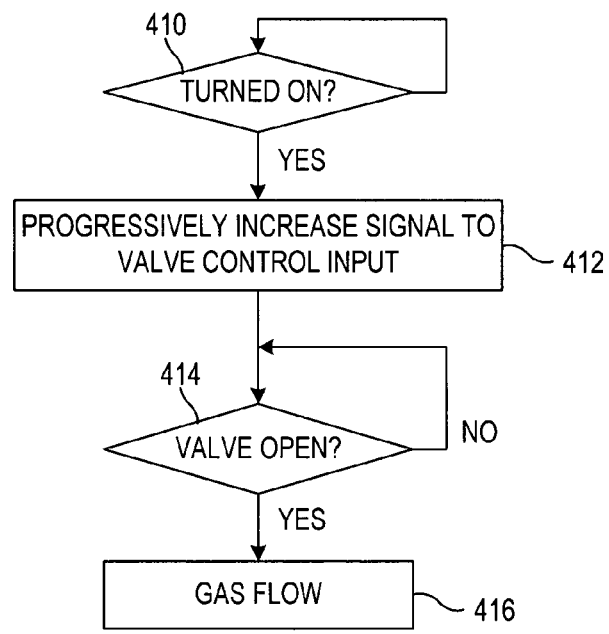

The state (e.g., open, closed) of the valve need not be monitored in order to determine whether to increase the duty cycle. For example, the signal may simply increase its duty cycle until it reaches a final duty cycle, whereby the duty cycle is not increased as a result of monitoring whether the valve changed state. An example of such an embodiment is depicted in FIG. 4B. When a sensor, user input, date, time, condition and/or other input criteria indicates that the valve is to be turned on as determined at block 410, a signal having a progressively increasing duty cycle is applied to the valve control input as shown at block 412. This signal continues to increase in duty cycle, and the valve will eventually open 414, resulting in gas flow 416. In this embodiment, the signal may continue to increase 412 in duty cycle to a final value even after the valve has opened 414, but the valve was still opened when the signal reached a value commensurate with the threshold at which the valve coil will open the valve.

Figure 4C:
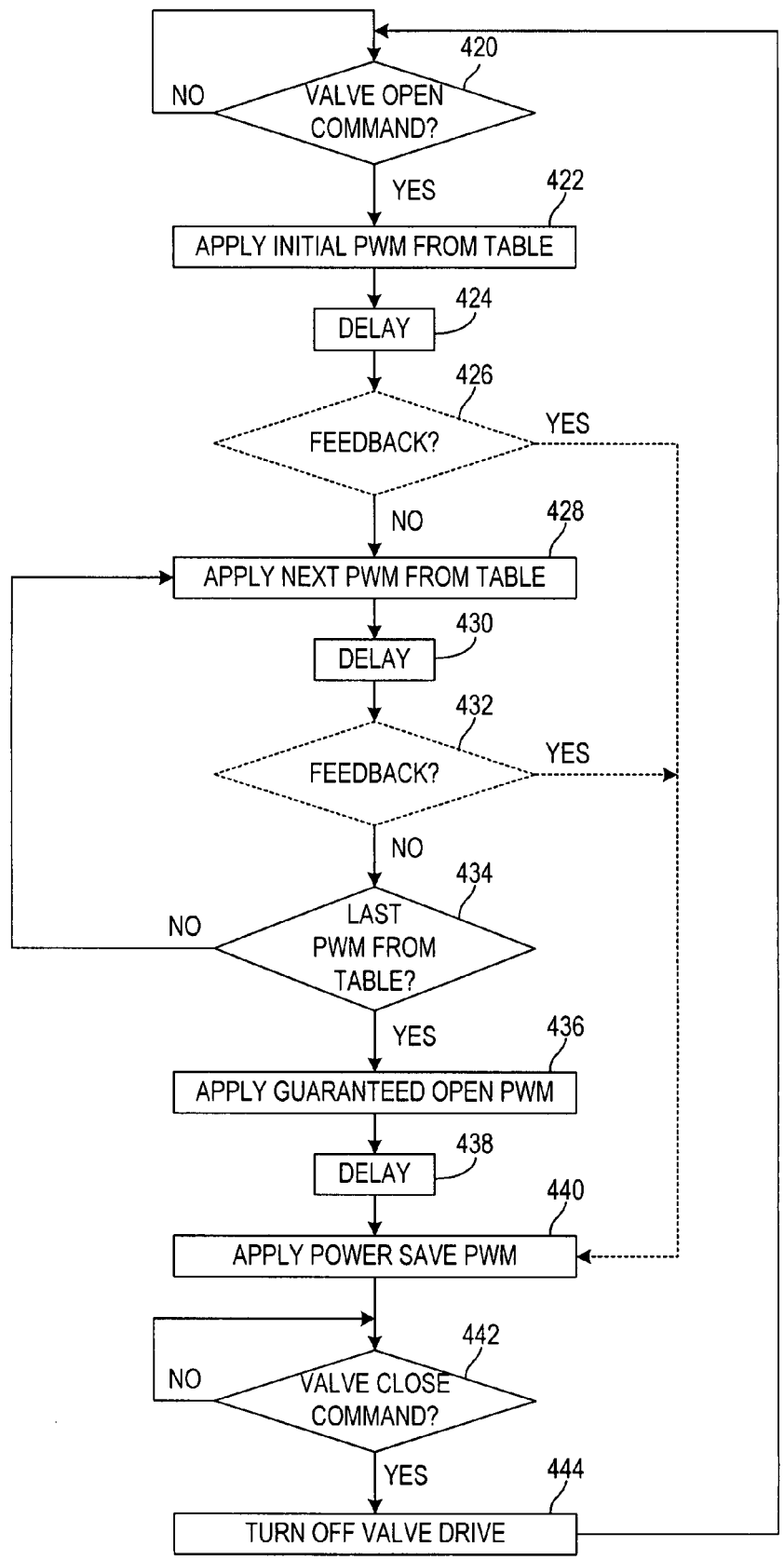

FIG. 4C is a flow diagram generally illustrating another exemplary embodiment of a method for controlling a solenoid gas valve or other valve in accordance with the present invention. When a valve open command is received 420, an initial pulse width modulated signal (PWM) is applied 422. In the illustrated embodiment, the initial PWM is determined from a table including data for each of the various possible stages of PWM signals, although any manner of identifying an initial PWM may be utilized. Processing may be delayed 424 in order to enable the mechanical components and/or other circuit components to act on the initial PWM. In an embodiment involving feedback indicating whether the valve was opened, a positive indication of a valve open condition as determined at decision block 426 can then bypass further increases in duty cycle. If there is no positive feedback indication, or feedback is not used, the next PWM from the table is applied 428. A delay 430 can again be allowed to occur to give the circuitry and particularly the mechanical components time to actuate if the effective power is sufficient to do so. Feedback may again optionally be considered as depicted at decision block 432. The process of applying the next PWM 428 and applying a delay 320 may continue until the last PWM from the table occurs 434. This "last" PWM is applied 436 to provide the final established effective power level to guarantee the valve's actuation under normal operating conditions and assuming that components and/or circuitry are not defective. A delay 438 may again be allowed to give the circuitry and particularly the mechanical components time to actuate, at which time a power save PWM may be applied 440. This power save PWM represents the power applied to maintain the valve in the open position, as was described as the post-actuation effective power levels 330, 334, 336 in connection with FIG. 3B. Thus, where feedback occurs 426, 432 indicating that the valve has opened, or the last PWM has been applied 436, the power save PWM may optionally be applied 440. The applied control current then remains substantially at that level until a valve close command is encountered 442, at which time drive to the valve is turned off 444, and the system can again wait for receipt of a valve open command 420.

It should be noted that "progressively increasing," "gradually increasing," or other similar phrases as used herein do not imply that the increase must always increase without any temporary leveling or decrease, but rather suggests that the signal will exhibit an overall increase over time. Thus, while a progressive or gradual increase in the duty cycle may in fact continually increase without any decrease, this is not required as an overall increase in the duty cycle, amplitude, etc. of the control signal over time is sufficient.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined from the claims appended hereto.

What is claimed is:

1. A method comprising:
    applying a power signal to a control input of a valve at a level less than a valve switch threshold at which the valve will be actuated;
    defining a plurality of increasing power stages, each corresponding to a respective duty cycle;
    progressively increasing the power to the control input by applying signals having the duty cycles ranging from a first of the duty cycles corresponding to a lowest of the power stages to a last of the duty cycles corresponding to a highest of the power stages at predetermined time intervals;
    actuating the valve when the power signal reaches the valve switch threshold; and
    completing the progressive incrementation of the power to the highest of the power stages without regard to when in the progressive incrementation the valve was actuated.

2. The method of claim 1, further comprising receiving a signal requesting gas flow, and wherein applying a power signal comprises applying the power signal to the control input of a solenoid gas valve in response to receiving the signal requesting gas flow.

3. The method of claim 1, wherein the valve comprises a normally-closed solenoid gas valve, and wherein actuating the valve when the power signal reaches the valve switch threshold comprises opening the normally-closed solenoid gas valve when the power signal reaches the valve switch threshold.

4. The method of claim 1, wherein the valve comprises a normally-open solenoid gas valve, and wherein actuating the valve when the power signal reaches the valve switch threshold comprises closing the normally-open solenoid gas valve when the power signal reaches the valve switch threshold.

5. The method of claim 1, wherein each of the duty cycles corresponds to a different table value.

6. The method of claim 1, further comprising injecting a delay between each progressive increase of the power.

7. An apparatus comprising:
    an input module configured to receive a valve state change signal;
    a processing module coupled to the input module to receive notification of the valve state change signal, and responsively generate a plurality of valve control signal levels, each corresponding to a different duty cycle, beginning with an initial duty cycle providing a signal less than a valve switch threshold and having increased duty cycles provided for respective time durations until reaching a final duty cycle independent of a valve actuation indication; and
    an output module configured to output the valve control signal.

8. The apparatus as in claim 7, wherein the processing module is configured to increase the duty cycle of the valve control signal until the duty cycle reaches a duty cycle limit.

9. The apparatus as in claim 7, wherein the input module is further configured to receive a valve state signal indicative of an open or closed state of a normally-closed valve, and wherein the processing module is further configured to increase the duty cycle of the valve control signal in response to each valve state signal indicating a closed state of the normally-closed valve.

10. The apparatus as in claim 7, wherein the input module is further configured to receive a valve state signal indicative of an open or closed state of a normally-open valve, and wherein the processing module is further configured to increase the duty cycle of the valve control signal in response to each valve state signal indicating an open state of the normally-open valve.

11. The apparatus as in claim 7, further comprising a storage module configured to store at least instructions, and wherein the processing module is coupled to the storage module to receive and execute the instructions to responsively generate the valve control signal having an increasing duty cycle over time.

12. The apparatus as in claim 7, further comprising a wireless transmission module coupled to receive the valve control signal generated by the processing module and configured to wirelessly transmit the valve control signal for use by a valve associated with the valve state change signal.

13. An apparatus comprising:
    means for receiving a valve state change signal;
    means for storing a plurality of duty cycle stages corresponding to a respective plurality of valve control signals;
    means for generating each of the duty cycle stages for particular time intervals in response to receipt of the valve state change signal, and for generating the duty cycle stages for the particular time intervals irrespective of when a targeted valve may be actuated; and
    means for driving a valve drive signal capable of controlling the targeted valve and having an initial duty cycle less than the targeted valve's switch threshold and increasing duty cycle corresponding to the valve control signal.

14. A system comprising:
    a valve;
    means for receiving a valve state change signal; and
    means for progressively increasing power used to actuate the valve over time and in response to receipt of the valve state change signal, including means for providing power signals having respective duty cycles ranging from a first duty cycle corresponding to a lowest of the power signals to a last duty cycle corresponding to a highest of the power signals without regard to when in the progressive incrementation of power the valve is actuated.

15. A system comprising:

a progressive power increase module configured to initially generate a valve control signal having a duty cycle providing a power less than a valve switch threshold, and to periodically increase the duty cycle of the valve control signal;

a solenoid valve having an input coupled to the progressive power increase module, the solenoid valve having a coil to receive the valve control signal and change the state of the solenoid valve when the duty cycle of the valve control signal reaches the valve switch threshold; and wherein the progressive power increase module is further configured to continue the periodic incrementation of the duty cycles until reaching a final duty cycle without regard to when in the periodic incrementation the state of the solenoid valve was changed.

16. The system of claim 15, wherein the progressive power increase module comprises:

a control circuit configured to provide a pulse width indicator signal designating increasing pulse widths at defined time intervals; and a pulse width modulator coupled to the control circuit to receive the pulse width indicator and configured to responsively generate the valve control signal having the periodically increased duty cycle.

17. The system of claim 15, wherein the progressive power increase module comprises a processing module configured to generate the valve control signal having the periodically increased duty cycle, and output module configured to output the valve control signal.

18. The system of claim 15, wherein the progressive power increase module is configured to periodically increase the duty cycle of the valve control signal until the duty cycle reaches a duty cycle limit.

19. The system of claim 15, wherein the solenoid valve comprises a normally-closed solenoid gas valve, and wherein the progressive power increase module is configured to increase the duty cycle of the valve control signal in response to received indications of a closed state of the normally-closed solenoid gas valve.

20. The system of claim 15, wherein the solenoid valve comprises a normally-open solenoid gas valve, and wherein the progressive power increase module is configured to increase the duty cycle of the valve control signal in response to received indications of an open state of the normally-open solenoid gas valve.

* * * * *